United States Patent [19]
Hampton et al.

[11] Patent Number: 5,281,249
[45] Date of Patent: Jan. 25, 1994

[54] RESHAPING A GLASS LENS BLANK SUSPENDED ON A FLOW OF GAS

[75] Inventors: Leslie E. Hampton, Corning; John W. Nelson, Painted Post, both of N.Y.

[73] Assignee: Corning Incorporated, Corning, N.Y.

[21] Appl. No.: 69,745

[22] Filed: Jun. 1, 1993

[51] Int. Cl.⁵ ............................................. C03B 23/00
[52] U.S. Cl. .................................. 65/25.1; 65/102; 65/182.2; 65/285; 65/286
[58] Field of Search .......... 65/182.2, 25.1, 25.4, 65/286, 102, 285

[56] References Cited

U.S. PATENT DOCUMENTS

| | | | |
|---|---|---|---|
| 2,395,727 | 1/1943 | Devol | 65/182.2 |
| 2,817,928 | 12/1957 | Lambert et al. | |
| 3,340,032 | 9/1967 | Kasperowicz et al. | |
| 3,449,102 | 3/1965 | Nedelec | 65/182.2 |
| 3,756,797 | 7/1971 | Akeyoshi | 65/182.2 |
| 3,961,927 | 6/1976 | Alderson et al. | 65/25 |
| 4,115,090 | 9/1978 | Comperatore | 65/25 |

FOREIGN PATENT DOCUMENTS

| | | | |
|---|---|---|---|
| 7322977 | 7/1973 | Japan | 65/25.1 |

Primary Examiner—W. Gary Jones
Assistant Examiner—John Hoffmann
Attorney, Agent, or Firm—Milton M. Peterson; Clinton S. Janes, Jr.

[57] ABSTRACT

A method and apparatus for imparting a predetermined contour to an ophthalmic glass lens.

The method comprises positioning a forming manifold in the base of a reshaping chamber, the upper surface of the manifold having a surface contour that is the reverse of the bottom contour surface of the reshaped lens, positioning the lens blank in the chamber, heating the lens blank to a temperature at which the blank deforms, and establishing a continuous, lateral flow of gas on the upper surface of the forming manifold whereby the glass is supported while it sags to the desired shape.

The apparatus comprises a reshaping chamber, a source of heat to bring a lens blank to its deforming temperature, a forming manifold having an upper surface contour that is the reverse of the desired contour on the lower surface of the reshaped lens blank, and means to supply a continuous, lateral flow of gas on the upper surface of the manifold whereby the glass blank is supported while it deforms to the desired shape.

19 Claims, 6 Drawing Sheets

RESHAPING A GLASS LENS BLANK SUSPENDED ON A FLOW OF GAS

FIELD OF THE INVENTION

The field is a method and apparatus for reshaping glass, in particular, an ophthalmic glass lens blank.

BACKGROUND OF THE INVENTION

Conveying molten glass on a gas cushion, such as an air film, is known in the glass forming art. It is customary to employ a carrier having numerous gas passageways, for example, pores or perforations. The cushioning gas is pumped through the passageways which open to the carrier surface. This forms a thin layer of gas between the glass and the carrier that carries the glass slightly spaced from the carrier surface.

The glass may be sheet glass on the draw, or during a processing step, such as tempering. It may also be a glass gob being delivered down a trough to a mold. In any case, the primary purpose is to avoid surface marring, contamination, or other damage from contact with the carrier.

It is also well known to reshape flat glass, for example, to form curved automotive glass. This is customarily accomplished by sagging or pressing a softened glass sheet against a form.

Ophthalmic lenses represent another product area that employs curved glass bodies. This product additionally requires an optical quality finish. To produce an ophthalmic lens, a lens blank is first pressed in a mold. At least one surface of the glass blank is then ground and polished to impart a required prescription.

Production of a multifocal lens is an even more complex operation. Traditionally, the practice has been to form a countersink in a monofocal lens blank; separately prepare a segment; fusion seal the segment in the countersink; grind and polish the blank to the required prescription.

To some extent, the segmented multifocal lens has been replaced by a progressive addition lens. Such a lens is one piece with the radius of curvature in the lower quadrant of the lens being decreased to develop additional lens power. The finished surface is an asymmetric asphere. This requires very specific, and closely controlled, grinding and polishing.

Inorganic ophthalmic lenses, because of their material density, may be of sufficient weight to cause wearer discomfort. This led to development of organic plastic lenses which have lower density, but also less scratch resistance. Further, the desirable feature of reliable photochromic behavior has only been available in glass.

This situation has led to intensive research to develop a composite lens embodying the desirable features of both plastic and glass. Such a composite is a laminated lens as described in U.S. Pat. No. 4,793,703 (Fretz, Jr.). In its simplest form, this laminated lens comprises an organic lens element adhesively bonded to a thin glass cap. It is contemplated that the glass cap may be on the order of one mm thick.

Development of the laminated lens disclosed by Fretz, Jr. presented the need for a complemental multifocal construction. It has been proposed to produce a high index, organic segment and insert such segment in a countersink in the resin element of the lens. However, this segmented structure, like its counterpart in glass, involves a rather complicated method of production.

Accordingly, attention has been directed to devising a simpler means of meeting the need for a multifocal construction in a laminated lens. The thinness of the glass cap militates against the traditional segmented structure. It also further complicates the grinding and polishing steps required in either the segmented structure or the more recent progressive addition lens design.

A basic purpose of the present invention is to provide a simple method of reshaping an ophthalmic glass lens blank. A further purpose is to provide a method that maintains an optical quality surface on a lens, thus avoiding the need for grinding and polishing the reshaped blank. A specific purpose is to provide a method of producing progressive addition lenses that avoids the current grinding and polishing practice. Another specific purpose is to provide a thin glass cap in the form of a progressive addition lens that is adapted to use as a corrective lens element in a laminated, glass-plastic lens structure.

SUMMARY OF THE INVENTION

To these and other ends, our invention contemplates a method of imparting a predetermined contour to an ophthalmic glass lens blank which comprises the steps of:

a. producing a forming manifold that has an upper surface with a surface contour that is the reverse of that to be imparted to the bottom of the lens blank, and that has uniformly spaced gas sources and sinks extending to the upper surface, b. positioning the forming manifold in the base of a reshaping chamber, c. positioning the lens blank on the forming manifold, d. heating the lens blank to a temperature at which it will deform due to gravity, and e. establishing a continuous, lateral flow of gas on the upper surface of the manifold between the gas sources and sinks, whereby the glass is supported and deforms to a shape having the surface contour that is the reverse of the upper surface of the forming manifold.

The invention further contemplates an apparatus for carrying out the method of imparting a predetermined contour to an ophthalmic glass lens blank which comprises:

a. a reshaping chamber in which the blank to be reshaped is positioned, b. a source of heat mounted above the glass lens blank to deliver heat to the upper surface of the lens blank, c. a forming manifold mounted in the base of the reshaping chamber, the upper surface of the forming manifold having a contour that is the reverse of the contour to be imparted to the reshaped lens blank, the manifold having uniformly spaced gas sources and sinks extending to its upper surface and d. means to supply a continuous, lateral flow of gas on the upper surface of the manifold between the gas sources and sinks, whereby the glass is supported and deforms to have a surface contour that is the reverse of the upper surface contour of the forming manifold.

PRIOR ART

In addition to the Fretz, Jr. patent mentioned earlier, attention is directed to the following U.S. patents:

U.S. Pat. No. 2,817,928 (Lambert et al.) describes a method of forming a glass article, such as a watchglass, having different curvatures. The method combines differential heating of a glass blank with vacuum forming. The patent does not employ a forming manifold.

U.S. Pat. No. 3,340,032 (Kasperowicz et al.) describes a method of changing the spherical shape of a cathode ray tube panel to a toroidal type curvature. The method comprises heating a spherical-shaped panel in a mold compressible in one direction and compressing the mold in that direction. There is no glass flow or forming manifold.

U.S. Pat. No. 3,961,927 (Alderson et al.) describes a method of shaping a glass article, for example a lens. Molten glass is delivered to a porous support member while feeding a gas under pressure through the support member to cushion the glass while it takes the approximate shape of the support member as it partially cools preparatory to further molding against a solid surface. This method is concerned with preliminary molding and cooling of molten glass, not reshaping a lens blank. Actual molding of a final shape is accomplished by conventional pressure means.

U.S. Pat. No. 4,115,090 (Comperatore) describes shaping glass sheets for laminated aircraft transparencies by gravity sagging on solid molds. Gas is blown between the mold surface and the sagging glass sheet to remove dust and dirt particles. There is no showing of a forming manifold.

DESCRIPTION OF THE INVENTION

The present invention was developed while searching for means to convert a thin, spherical-shaped lens blank to a lens having a progressive addition. The lens blank was a cap of approximately one mm thickness used as a glass cap in a laminated, glass-plastic lens. Accordingly, the invention is described with reference to this development.

However, that it may have broader application will be readily apparent. For example, it may be used in producing any desired lens shape, including the spherical shape, from a lens blank. Also, it may be used with thicker blanks, such as a conventional glass lens.

The invention is based on our discovery of a way to reshape an ophthalmic lens blank to have a predetermined contour. We have found that a blank can be sagged in a controlled manner by supporting it on a thin cushion of gas continuously flowing in a lateral direction between gas sources and sinks that extend to the face of a forming manifold. A manifold is a body having a multitude of open passageways.

The term "gas sources and sinks" means gas passageways that extend to the upper surface of the manifold. The sources are employed to deliver gas to the surface, the sinks are employed to withdraw gas from the surface.

Figure 1:
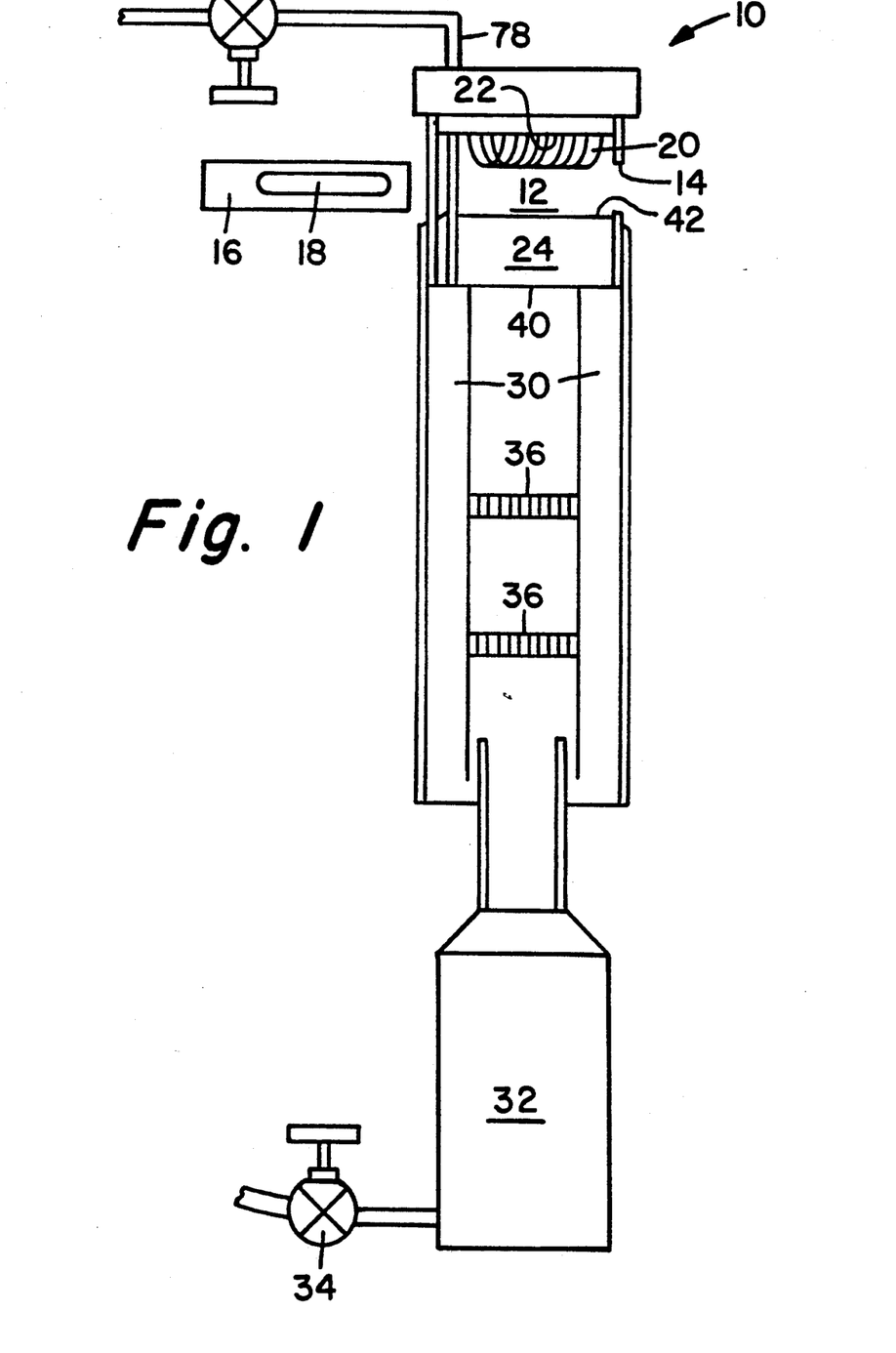
FIG. 1 is a schematic side view of an apparatus for practicing the invention.

FIG. 1 is a schematic side view showing an apparatus 10 for practicing the invention. Apparatus 10 includes a sample chamber 12 having the shape of a cylindrical can. Chamber 12 has an opening 14 for introducing a lens blank to be reshaped, and a rotatable sleeve 16 to close opening 14. Sleeve 16 has an opening 18 which will coincide with opening 14 as sleeve 16 is rotated.

Chamber 12 has a heating element 20 mounted on its upper surface 22. This element radiates heat to a sample lens blank when the blank is positioned in chamber 12. The temperature is controlled by a thermocouple (not shown) linked to a programmable power supply. Chamber 12 is also provided with a forming manifold 24 which is a key element in the invention. Manifold 24 is further illustrated in FIGS. 2-4.

Figure 2:
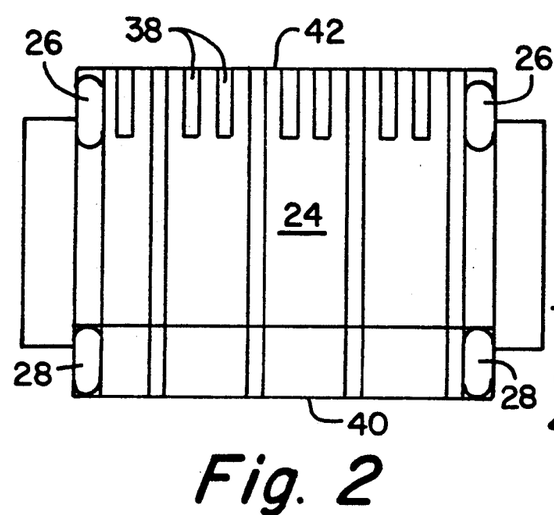
FIG. 2 is a side view in cross-section of one form of forming manifold in accordance with the invention.

As shown in FIG. 2, forming manifold 24 may be mounted in the base of chamber 12 by sealing members 26 and 28. These members may be composed of any suitable sealing cement. The manifold and chamber assembly may rest on, and be supported by, an insulated tubular member 30. The base of tubular member 30 is connected to a heater 32. Gas may be fed to heater 32 from a source (not shown) and metered by valve 34. Tubular member 30 is provided with baffles 36. The baffles homogenize the heated gas as it emanates from heater 32 and is drawn up through tubular member 30.

FIG. 2 is an enlarged view in cross-section showing one embodiment of forming manifold 24. Characteristically, manifold 24 is provided with a plurality of vertical passageways 38 opening on the upper surface 42 of the manifold. A selected number of passageways 38 are countersunk in their lower portion and metal tubes 44 are inserted therein. This is shown more clearly in FIGS. 3 and 4.

Size of the gas passageways is necessarily limited to some degree. However, there are no precise limits. By way of example, we have employed passageways 38 having diameters of 0.075 inches (1.9 mm) and metal tubes 44 with diameters of 0.094 inches (2.4 mm). The spacing, center-to-center, of passageways 38 may be 0.105 inches (2.7 mm).

Figure 3:
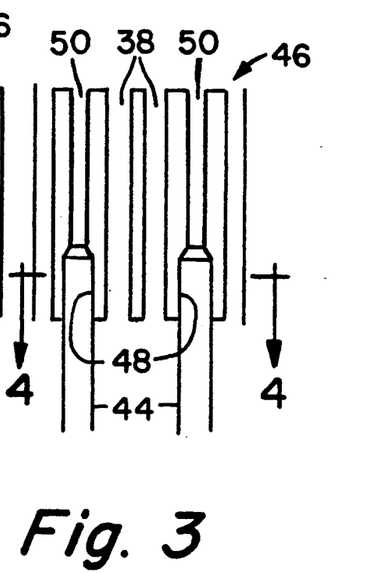
FIG. 3 is an enlarged partial side view illustrating an arrangement of tubes in one version of the forming manifold of FIG. 2.

FIG. 3 is an enlarged side view showing a passageway arrangement 46 wherein each third member 50 of passageways 38 has a countersunk portion 48 into which a metal tube 44 is inserted. A limited segment of a manifold is shown to better illustrate the arrangement, it being understood that a much larger number of passageways will be present in manifold 24.

Figure 4:
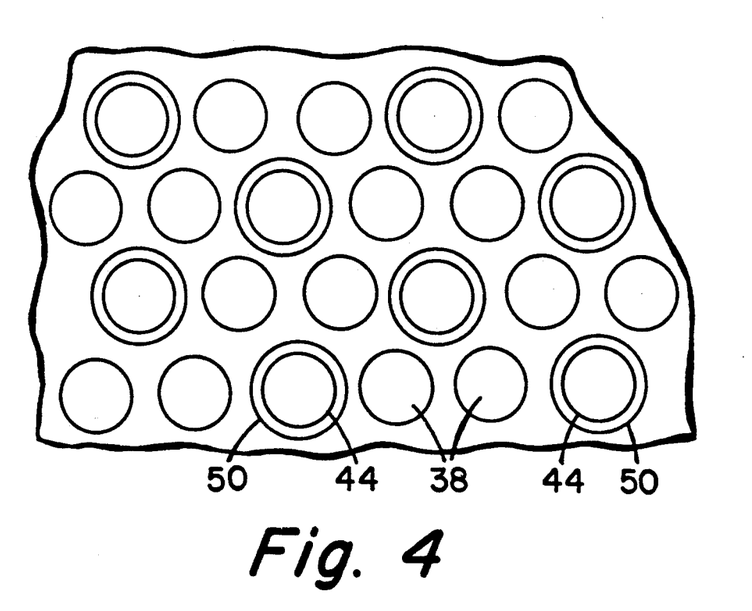
FIG. 4 is an enlarged view along line 4—4 in FIG. 3 further showing the tube arrangement of FIG. 3.

FIG. 4 is a partial view taken along line 4—4 on FIG. 3. It further illustrates the arrangement of passageways 38 and countersunk passageways 50. In this arrangement, both the open and countersunk tubes form hexagonal patterns, the patterns being at right angles to each other.

Figure 5:
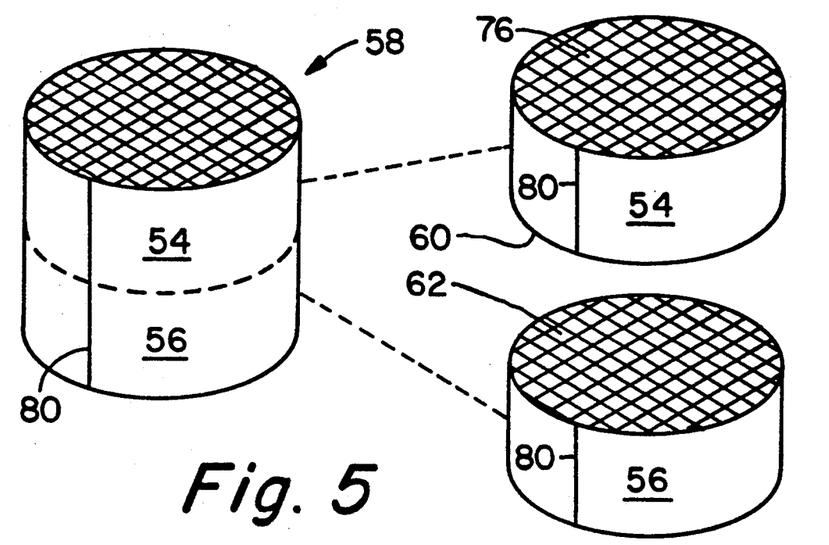
FIG. 5 is an exploded, perspective view of a blank for use in constructing a modified forming manifold.

FIG. 5 is an exploded, perspective view that illustrates an alternative form of manifold and method of production. Bodies 54 and 56 are formed from a single, cylindrical honeycomb 58 by slicing the honeycomb transversely. This provides matching faces 60 and 62.

Figure 6:
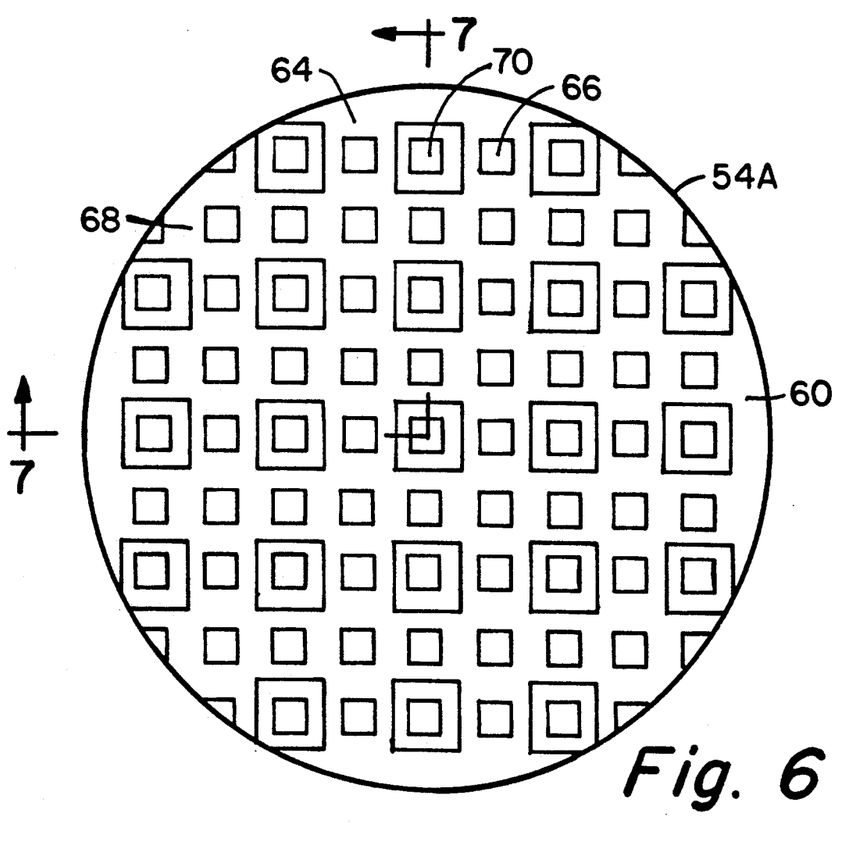
FIG. 6 is a top plan view of the blank of FIG. 5.

Vertical and horizontal channels are cut into the face of body 54 to yield body 54A. FIG. 6 is a top plan view of face 60 on body 54A showing this face as prepared for assembly of a modified forming manifold.

Figure 7:
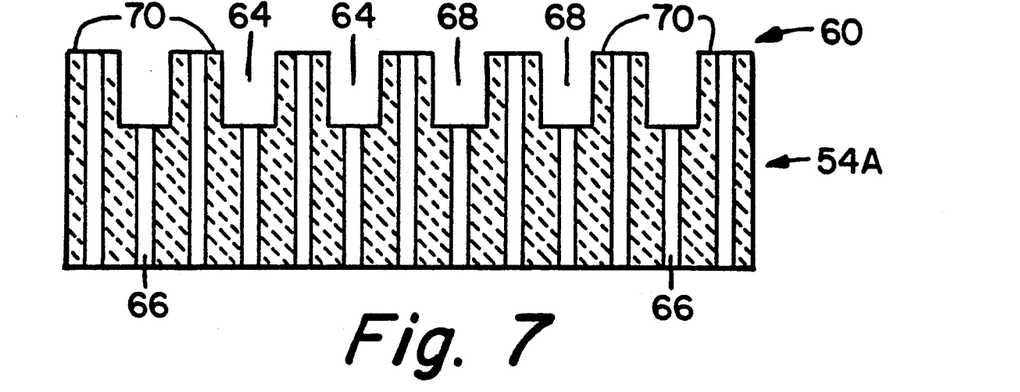
FIG. 7 is a cross-sectional view taken along line 7—7 on FIG. 6.

FIG. 7 is a cross-sectional view taken along line 7—7 on FIG. 6. It shows that face 60 on body 54A has channels 64 cut into it such that alternate columns of holes 66 are recessed. Channels 68 are then cut at right angles to channels 64, again so spaced as to remove alternate rows of holes 66 in that direction. This leaves a plurality of square tubes 70 extending from a recessed space formed by intersecting channels 64 and 68.

Figure 8:
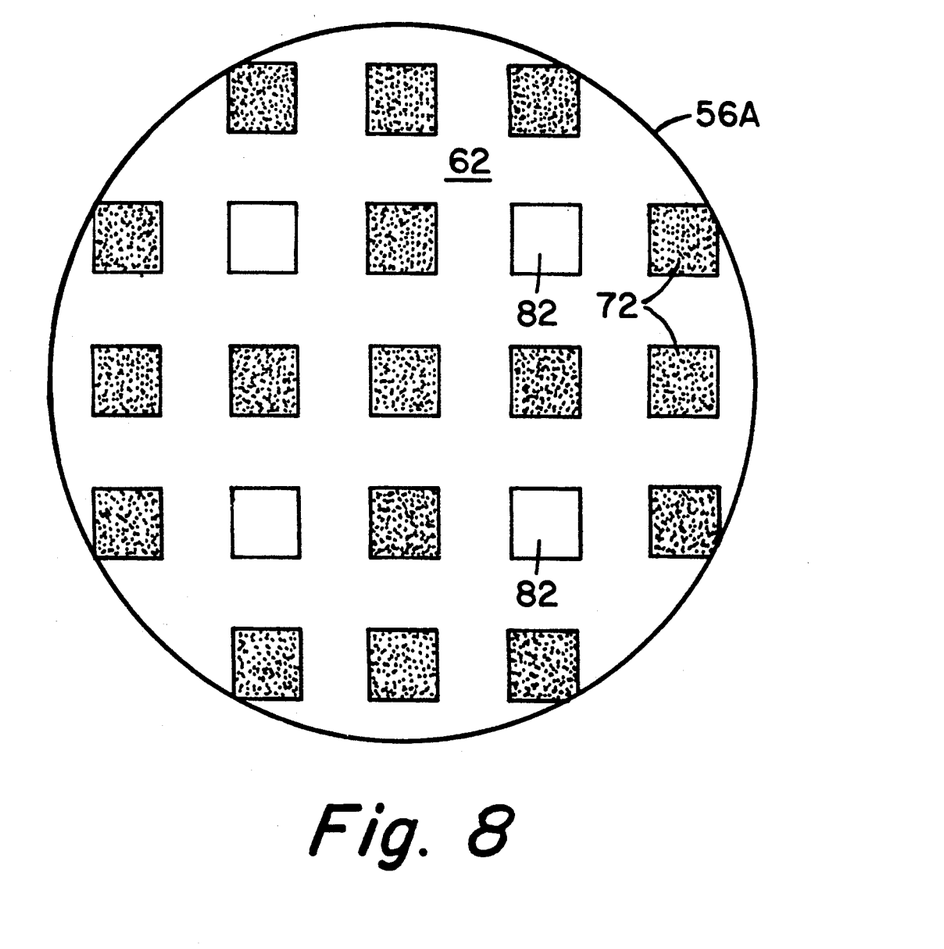
FIG. 8 is a top plan view of one element of FIG. 5 prepared for reassembly.

FIG. 8 is a top plan view of body 56A with alternate rows of holes 72 on face 62 of element 56A plugged, for example, by filling with a material of like, or compatible, composition to that of element 56A. The cells of body 56A should be aligned such that plugged holes 72 of body 56A align with open holes 64 and 68 of body 54A.

Figure 9:
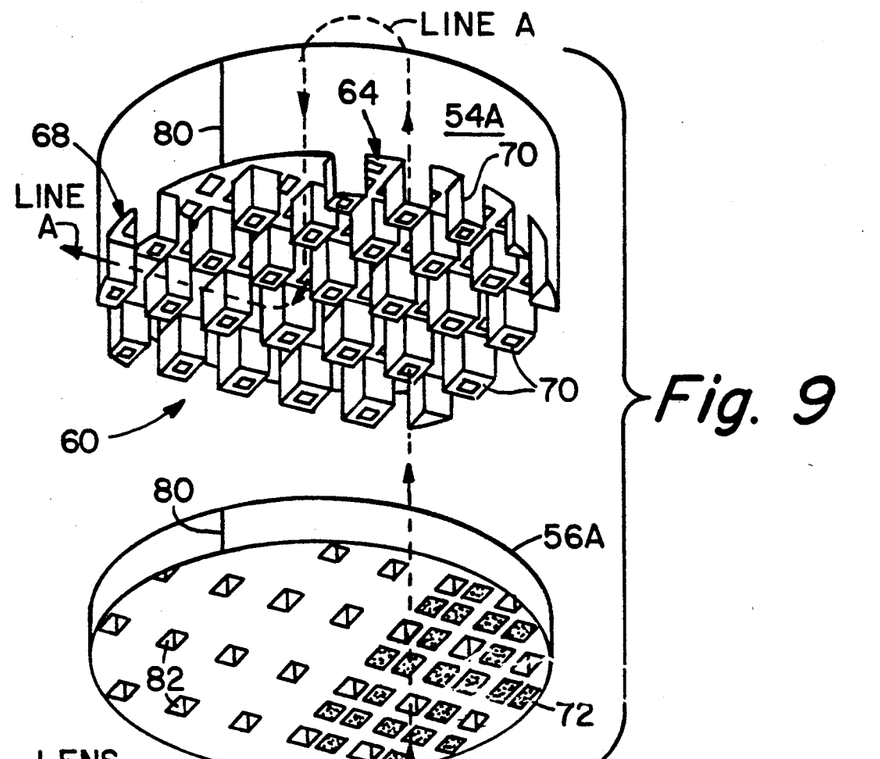
FIG. 9 is an exploded view showing the elements of FIG. 5 as prepared for assembly of the modified forming manifold.

FIG. 9 is an exploded view in perspective. It shows bodies 54A and 56A after processing and preparatory to being reassembled into a unitary body. Like FIGS. 7 and 8, it shows face 60 on body 54A with square tubes 70, and body 56A with alternate rows of filled holes 72. Line A shows the path taken by heated gas as it travels into hole 82, through tube 70 to open face 76 of body 54A. The gas is then drawn down into cell 66 and out slots 64 and/or 68.

Figure 10:
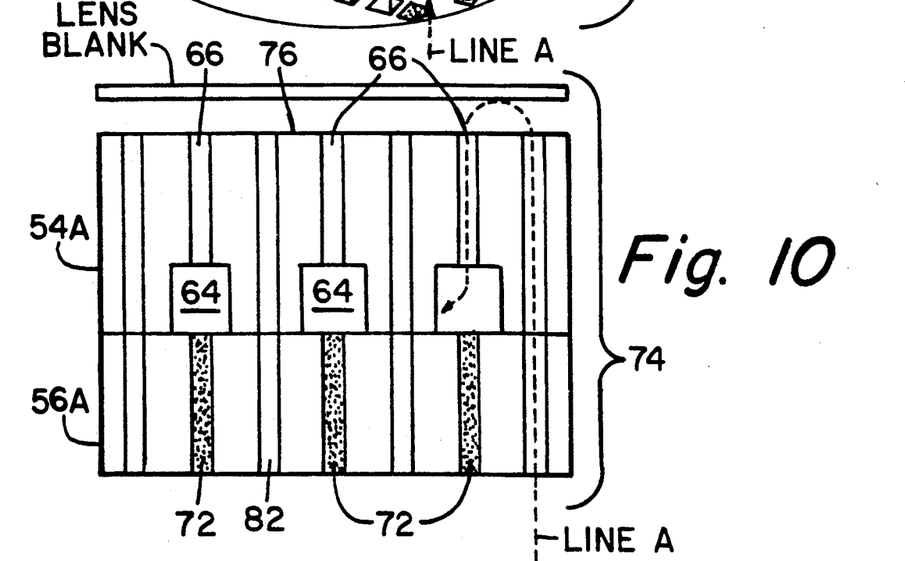
FIG. 10 is a side view in cross-section showing the assembly of the elements of FIG. 9.
Figure 11:
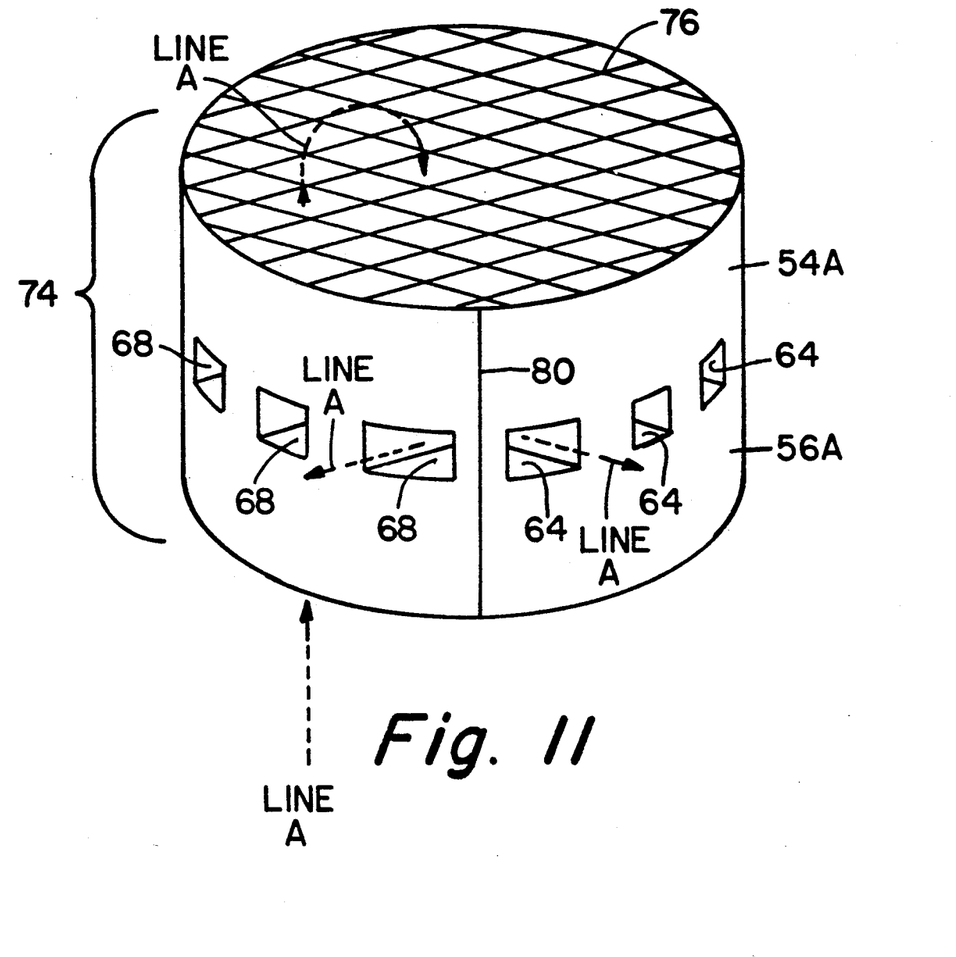
FIG. 11 is a perspective view of the assembly of FIG. 10.

FIG. 10 is a side view in cross-section of processed bodies 54A and 56A as reassembled to form a manifold 74 shown in FIG. 11. This reassembly of body 54A and body 56A requires the same alignment and orientation as were present in original body 58. Line 80 defines the proper alignment of bodies 54A and 56A. FIG. 10 shows that the arrangement is such that the plugged holes 72 of body 56A correspond to the recessed channels 64 and 68 of body 54A when the two bodies are matched. The matching faces are then aligned and sealed together to form manifold 74 as illustrated in perspective in FIG. 11. Line A of FIG. 10 again shows the path taken by heated gas as it is blown to the top surface of the manifold, then drawn back into the body to form an air cushion.

The extruded cellular honeycomb structure that makes up the manifold can be made of any material that can withstand the conditions required of the lens forming apparatus. Two examples of such material include zirconia and powdered metal.

In any case, the honeycomb body is used to form elements 54A and 56A while still in the "green", that is, unsintered, state. Consequently, the faces 60 and 62 may be wet to form a slurry paste on each face. The elements 54A and 56A are then brought together and dried to form a single body 74.

The open cellular end 76 of body 74 may then be machined to impart the desired contour to the body. As explained earlier, this contour is the reverse of the contour desired on the lower face of the glass lens blank being reshaped. Subsequently, body 74 is sintered to form a durable, highly densified material.

If the sintered honeycomb body is formed from an electroconductive material, in particular, a metal, it possesses the ability to pass current. As a result, it may, with some modification, be used as an electrically heated unit. This, of course, would eliminate the need for an external heat source. Such electrically heated, metal honeycombs, their use and their production are described with respect to catalytic converters in U.S. Pat. No. 5,063,029 (Mizuno et al.) and European Publication No. 0488716A1 (Harada et al.).

In operation, a vacuum line 78 extends into apparatus 10 at a point just below the bottom face of manifold 24. Having reference to FIG. 2, gas is withdrawn down passageways 38 and exhausted through vacuum line 78. In turn, heated gas is drawn up metal tubes 48 and into passageways 50 which lead to the face of manifold 24. The heated air is drawn across the face of forming manifold 24 between the several sets of passageways. The gas flow rate, the gas temperature, and the glass temperature will all be controlled with known means to provide sagging without flow. A lens blank will then float on a thin cushion of heated gas and sag to the contour of forming manifold 24.

We claim:

1. A method of imparting a predetermined contour to an ophthalmic glass lens blank which comprises the steps of:
    a. producing a forming manifold that has an upper surface with a desired surface contour that is the reverse of that to be imparted to the bottom of the lens blank, and that has uniformly spaced gas sources and sinks extending to the upper surface,
    b. positioning the forming manifold in the base of a reshaping chamber,
    c. positioning the lens blank above the forming manifold,
    d. heating the lens blank to a temperature at which it will deform due to gravity,
    e. establishing a continuous lateral flow of gas on the upper surface of the manifold between the gas sources and sinks, whereby the glass is supported and deformed to a shape having a surface contour that is the reverse of the upper surface of the forming manifold.

2. A method in accordance with claim 1 which comprises machining the upper surface of the forming manifold to impart the desired surface contour.

3. A method in accordance with claim 2 wherein the machined contour is the reverse of that required for a progressive addition lens.

4. A method in accordance with claim 1 which comprises constructing the forming manifold with two sets of vertical passageways, both of which open on the top surface of the forming manifold, extending the lower ends of a first set of the vertical passageways to open at a lower level than the second set of such passageways and creating an intermediate chamber through which the extended passageways pass and from which gas may be exhausted.

5. A method in accordance with claim 4 which comprises extending the first set of vertical passageways to a lower level by countersinking the lower ends of the first set of passageways and inserting tubes in the countersunk portions.

6. A method in accordance with claim 5 which comprises flowing heated gas to a chamber into which the elongated tubes countersunk in the first set of vertical passageways open.

7. A method in accordance with claim 6 which comprises exhausting gas from the intermediate chamber to create a gas flow upwardly through the extending tubes in the first set of vertical passageways, laterally over the forming manifold upper surface and downwardly through the second set of vertical passageways.

8. A method of imparting a predetermined contour to an ophthalmic glass lens blank which comprises the steps of:
   a. machining the upper surface of a forming manifold having two sets of vertical passageways to impart a surface contour to the upper surface of the forming manifold that is the reverse of that desired on a reshaped lens blank,
   b. mounting the forming manifold in the base of a reshaping chamber for a lens blank,
   c. supplying a flow of heated gas to a selected pattern of the vertical passageways in the forming manifold,
   d. exhausting gas from the base of the forming manifold to create a gas flow upwardly in a first set of vertical passageways, laterally over the manifold upper surface and downwardly through the second set of vertical passageways,
   e. positioning the lens blank over the forming manifold in the reshaping chamber,
   f. heating the lens blank to a temperature at which it will deform due to gravity,
   g. adjusting the ratio of gas inflow to gas outflow to provide a gas flow over the forming member surface between the inlet and outlet passageways that is sufficient to maintain the heated lens blank suspended above the former, and
   h. continuing the gas flow and heating of the lens blank until the blank assumes a shape having a lower surface contour that is the reverse of the upper surface of the forming manifold.

9. An apparatus for imparting a predetermined contour to an ophthalmic glass lens blank which comprises:
   a. a reshaping chamber in which the blank to be reshaped is positioned,
   b. a source of heat mounted above the glass lens blank to deliver heat to its upper surface,
   c. a forming manifold mounted in the base of the reshaping chamber, the forming manifold having an upper surface contour that is the reverse of the contour to be imparted to the reshaped lens blank, the manifold having uniformly spaced gas sources and sinks extending to its upper surface, and
   d. means to supply a continuous lateral flow of gas on the upper surface of the manifold, between the gas sources and sinks, whereby the glass is supported and deforms to a surface contour that is the reverse of the upper surface contour of the forming manifold.

10. An apparatus in accordance with claim 9 wherein the upper surface contour of the forming manifold is the reverse of the undersurface of a progressive addition lens.

11. An apparatus in accordance with claim 9 wherein the forming manifold has two sets of vertical passageways extending to its upper surface, a first set capable of delivering a flow of gas to the upper surface of the forming manifold, and the second set capable of withdrawing the gas.

12. An apparatus in accordance with claim 11 comprising means to supply heated gas to the first set of vertical passageways.

13. An apparatus in accordance with claim 11 wherein the first set of vertical passageways extends to a lower level than the second set and creating an intermediate chamber through which the extended passageways pass and from which gas may be exhausted.

14. An apparatus in accordance with claim 13 comprising means to exhaust gas from the intermediate chamber.

15. An apparatus in accordance with claim 11 wherein the lower ends of the first set of vertical passageways are countersunk and elongated metal tubes are inserted in the countersinks.

16. An apparatus in accordance with claim 9 wherein the forming manifold is composed of a cylindrical honeycomb body separated into a first part and a second part.

17. An apparatus in accordance with claim 16 wherein the first part of the honeycomb body has two sets of slots, the sets being perpendicular to each other and being separated by rows of square tubular projections and each slot having a row of passageways terminating in its base.

18. An apparatus in accordance with claim 17 wherein the second part has rows of passageways plugged, the rows of plugged passageways lining up with the slots cut in the face of the first part.

19. An apparatus in accordance with claim 18 wherein the first part and the second part of the honeycomb body are reintegrated into a unitary body wherein the unplugged holes in the second part coincide with the holes in the square projections on the first part.

* * * * *